March 28, 1939.     G. G. H. RYDBERG     2,151,941
MEASURING APPARATUS
Filed Feb. 13, 1936     2 Sheets-Sheet 1
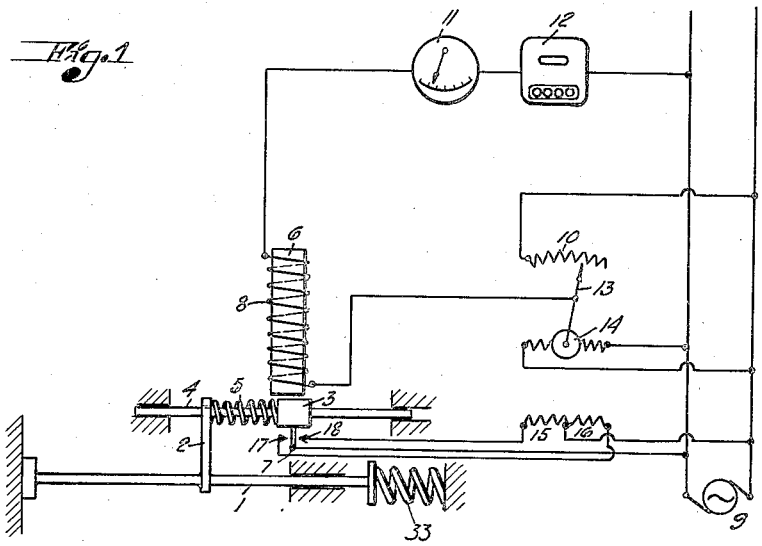
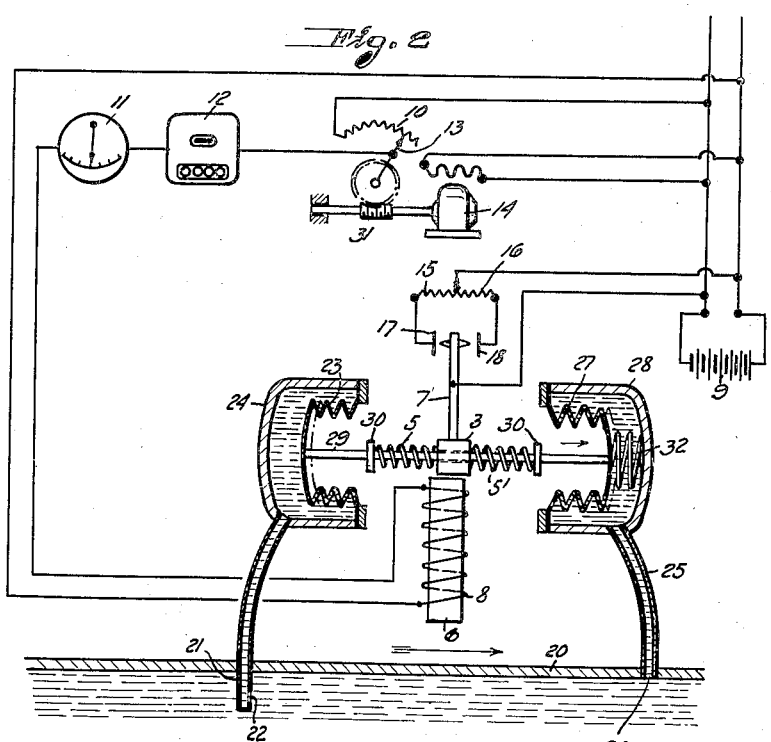

March 28, 1939.     G. G. H. RYDBERG     2,151,941
MEASURING APPARATUS
Filed Feb. 13, 1936     2 Sheets-Sheet 2
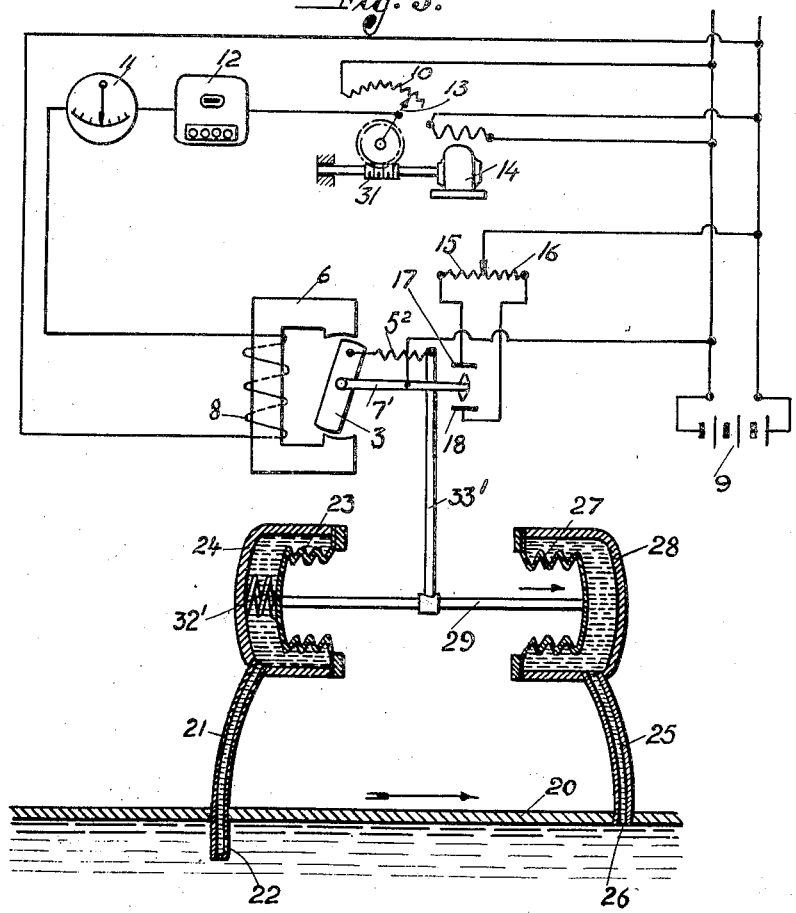

Patented Mar. 28, 1939

2,151,941

UNITED STATES PATENT OFFICE 2,151,941

MEASURING APPARATUS

Gustav Georg Herman Rydberg, Stockholm, Sweden, assignor to Svenska Ackumulator Aktiebolaget Junger, Stockholm, Sweden Application February 13, 1936, Serial No. 63,799
In Sweden February 26, 1935

12 Claims. (Cl. 177—351)

The present invention relates to apparatus for measuring the velocity and the quantity of flowing liquids or gases, which are hereinafter referred to as the measuring quantity.

The invention relates more particularly to apparatus of the above mentioned kind, which comprise a member, arranged to receive the variations of the measuring quantity, an electric circuit, including an electro-magnet and associated controlling means, the armature of the magnet being actuated by the receiving member, and electrical measuring instruments, the indications of which are determined by the strength of current in the electro-magnet.

In such apparatus the moment of force of the electro-magnet has to wholly balance the moment of force of the receiving member. In order to balance the maximum values of the moment of force of the receiving member, which occur at great variations of the measuring quantity, it has been necessary to provide a transmission ratio between the receiving member and the armature of the magnet in order that the dimensions of the magnet may not be unreasonably great. Such a reducing mechanism entails either constructive complications or a considerably reduced sensitiveness particularly within that part of the measuring range, where the values of the measuring quantity are small.

These drawbacks are avoided in the present invention, inasmuch as no reducing mechanisms are necessary. The receiving member and the electro-magnet can be dimensioned entirely independent of each other. The electro-magnet can be made very small, since it has for its object solely to control the comparatively small energy required for the movement of the measuring instruments. By such means the use of alternating current and instruments adapted for such current are rendered possible, which instruments and particularly the ampere hour meters are much more reliable than those for direct current.

The invention consists essentially in this that there is provided an elastic transmission member of such construction between the receiving member and the armature of the electro-magnet that but part of and preferably a smaller part of the force performed by the receiving member under the influence of the measuring quantity is transmitted to the armature of the electro-magnet. The transmission member may be so constructed and arranged that its direction-force on the armature will vary in a square ratio in response to a variation of the measuring quantity.

In the annexed drawings several embodiments of apparatus according to the invention are diagrammatically shown. Fig. 1 illustrates an embodiment, where the movement of the receiving member is thought to be performed as a square of a linear variation of the measuring quantity. Fig. 2 shows an application of the embodiment according to Fig. 1 wherein the apparatus is utilized for measuring the speed of and the distance travelled by a ship. Fig. 3 shows a modification of the arrangement shown in Fig. 2.

Referring to Fig. 1, I designates a receiving member, the length variation of which is thought to take place as a square of a linear variation of the measuring quantity. The receiving member is provided with an arm 2 having an aperture, through which passes freely a suitably guided rod 4 carrying the armature 3 of an electro-magnet 6. Disposed between the arm 2 and the armature is a linearly acting spring 5, the tension direction of which is parallel to the direction of movement of the receiving member I, so that the square of the axial movement of the member results in a square compression of the spring and thus in a square variation of the force of the spring. The force performed during axial movement of the receiving member is counter-acted by a relatively heavy spring 33.

Rigidly connected to the armature 3 is a contact member 7. The magnet coil 8 is connected to an alternating current generator 9 through a circuit, including an adjustable resistance 10 and also an ammeter 11 and an ampere hour meter 12. The resistance 10 is adjusted by means of a contact arm 13 connected to one terminal of the coil 8 and actuated by a reversible electric motor 14 fed from the source of current. One end of each of the reversing windings 15 and 16 is connected to one pole of the source of current, while the other ends of said windings may be alternately connected to the other pole by means of the contact member 7 carried by the armature 3 and the contacts 17 and 18, respectively.

The displacing movement of the armature 3 relatively to the magnet core 6 is very small and has for its object only to bring the contact member 7 into contact with the one or the other of the contacts 17 and 18 in order to complete a circuit to one or the other of the windings 15 and 16 and thus cause the motor 14 to rotate in one direction or the other, so that by means of the contact arm 13 more or less of the resistance 10 is included or excluded whereby the current flowing in the coil 8 is reduced or raised, respectively. As apparent from Figure 1, the armature lies somewhat displaced relatively to the electro-magnet, and the force, through which the magnet tends to displace the armature in the direction towards the symmetrical position, increases in a square ratio with an increase of current through the magnet coil 8.

At equilibrium between the attractive force of the magnet on the armature and the force of the spring the contact member 7 occupies its intermediate position between the contacts 17 and 18 without being in contact with either. If the measuring quantity increases, the member 1 is shifted and the spring compression increases, with the result that the contact member 7 is brought into contact with the contact 18. Thus the motor winding 15 is connected across the source 9, and the motor rotates in a counterclockwise direction, whereby the resistance 10 will be decreased and thus the strength of current in the magnet coil 8 and also the attractive force of the magnet will increase, until at which equilibrium again takes place, at which the motor stops. If instead the spring compression should decrease, the force of the magnet will overcome the spring pressure, and the contact member 7 is moved into engagement with the contact 17, whereby the motor winding 16 is connected across the source 9 and the motor will rotate in a clockwise direction to include more of the resistance 10, until equilibrium again takes place, at which moment the motor field circuit is broken at 17 and the motor stops.

The ammeter 11 indicates the momentary value of the measuring quantity and the ampere hour meter the time integral thereof.

Fig. 2 illustrates an application of the invention to a ship.

The bottom of the ship is designated at 20, and through said bottom extends a pipe 21, which is closed at its lower end and provided with an aperture 22 at the side thereof directing forwards. The pipe opens into a housing 24 containing a flexible bellows 23. In proximity to the pipe 21 there is arranged a second pipe 25, which however does not extend below the bottom of the ship, but is provided with an opening 26 directed downwards. The pipe 25 opens into a second housing 28 located opposite the housing 24 and containing a flexible bellows 27. Arranged between the bellows 23 and 27 is a rod 29, upon which the armature 3 of the electro-magnet 6 is freely displaceable. In order to assist the bellows 23 and 27 in resisting the pressure a spring 32 is inserted between the bellows 27 and the opposite wall of the housing 28. Disposed between the armature 3 and flanges 30 on the rod 29 are linearly acting springs 5 and $5^1$ (as is the case according to Fig. 1, where however but one spring is provided), the spring $5^1$ of which merely serves as a support for the armature moving upon the rod 29.

Rigidly connected to the armature is, as in the form of embodiment according to Fig. 1, a contact member 7 connected to one pole of the source of current 9 and which cooperates alternately with the two stationary contacts 17 and 18, in order to complete a circuit to one or the other of the motor windings 15 and 16. The motor actuates through a worm gear 31 the contact arm 13 of the adjustable resistance 10 which is included in the circuit of the magnet coil 8 and the measuring instruments 11, 12.

During forward motion of the ship (in the direction of the arrow) a pressure difference arises in the pipes 21 and 25 and in the housings 24 and 28, and the pressure difference is proportional to the square of the velocity of the ship. The resulting pressure is transmitted through the bellows 23 and 27 to the rod 29, which will move towards the right and compress the spring 32. By such movement of the rod 29 there will be transmitted to the armature 3 through the spring 5 such part only of the resulting pressure, which corresponds to the compression of the spring 5. If equilibrium exists between the partial pressure and the attractive force of the magnet on the armature, the contact member 7 will take up the intermediate position shown in Figure 2. If on the other hand one of the forces overcomes the other, a contact will occur either at 17 or at 18, and the motor 14 will rotate to include or exclude resistance, until a new position of equilibrium arises. The speed of the ship is read on the ammeter 11 and the distance on the ampere hour meter 12.

In the modification shown in Fig. 3 similar details are designated by the same reference numerals as in Fig. 2. This modification differs from Fig. 2 in that the armature 3 of the electro-magnet 6, 8 is made to turn and carries the contact arm $7^1$ which is movable between the stationary contacts 17 and 18. The armature 3 is actuated by a weak spring $5^2$ fastened to an upright $33^1$ secured to the rod 29 which extends between the two bellows 23 and 27. A spring $32^1$ is inserted between the bellows 23 and the end wall of the housing 24 instead of between the bellows 27 and the end wall of the housing 28, as in Fig. 2.

The action of the apparatus according to Fig. 3 is exactly the same as described above with reference to Fig. 2 with the sole exception that here the springs $5^2$ and $32^1$ act as tension springs and not through compression as in Fig. 2.

From the foregoing it is apparent that a part only of the work performed by the receiving member is used for deforming the spring, which through its pressure actuates the armature. Thus by making the spring weak the pressure on the magnet armature will be small. As a consequence the magnet can be made weak and therefore adapted for alternating current, while the receiving member can quite independent thereof be constructed for the greatest stress in question. If for any reason the magnet circuit should be broken, no risk arises from a crushing of the receiving member, which on the other hand may be the case with known apparatus of this type which are based on a full balance between the force executed by the receiving member and the force of the magnet and where the receiving member cannot be made to resist the stresses, arising at a break of the magnet circuit.

The above described embodiments relate to measuring systems according to the so-called zero-measuring principle, which means that the spring force actuating the armature of the electro-magnet is counteracted by the electro-magnet in such manner that in the measuring position, when a full balance is at hand, the armature is restored into its initial position (the zero-position). The invention is also applicable to measuring systems of the type described, where the measuring method proper is not based on the zero-measuring principle. In the latter case the measuring positions of the armature will vary according to the variations of the measuring quantity.

What I claim as new and desire to secure by Letters Patent of the United States of America is:

1. Apparatus for measuring the velocity and quantity of flowing media comprising a receiving member operative under the influence of the variations of said quantity, an electrical circuit, an electro-magnet comprising an armature and a coil in said electrical circuit, controlling means in said circuit for regulating the strength of current in said magnet coil, said controlling means being in operative connection with said armature, electrical measuring instruments in said circuit, the indications of which are determined by the strength of current in said magnet coil, an elastic transmitting member disposed between said receiving member and said armature and operative to transmit a part only of the force exerted on said receiving member under the influence of the variations of the measuring quantity to said armature, and electrical means for automatically returning said armature to its zero position at the indicating positions of said instruments.

2. Apparatus for measuring the velocity and quantity of flowing media comprising a receiving member operative under the influence of the variations of said quantity, an electrical circuit, an electro-magnet comprising an armature and a coil in said electrical circuit, controlling means in said circuit for regulating the strength of current in said magnet coil, said controlling means being in operative connection with said armature, electrical measuring instruments in said circuit, the indications of which are determined by the strength of current in said magnet coil, a coiled spring between said receiving member and said armature and operative to transmit a part only of the force exerted on said receiving member under the influence of the variations of the measuring quantity to said armature, and electrical means for automatically returning said armature to its zero position at the indicating positions of said instruments.

3. Apparatus for measuring the velocity and quantity of flowing media comprising a receiving member operative under the influence of the variations of said quantity, an electrical circuit, an electro-magnet comprising an armature and a coil in said electrical circuit, controlling means in said circuit for regulating the strength of current in said magnet coil, said controlling means being in operative connection with said armature, electrical measuring instruments in said circuit, the indications of which are determined by the strength of current in said magnet coil, an elastic transmitting member disposed between said receiving member and said armature and operative to transmit a part only of the force exerted on said receiving member under the influence of the variations of the measuring quantity to said armature, said armature being arranged to perform a rectilinear movement, and electrical means for automatically returning said armature to its zero position at the indicating positions of said instruments.

4. Apparatus for measuring the velocity and quantity of flowing media comprising a receiving member operative under the influence of the variations of said quantity, an electrical circuit, an electro-magnet comprising an armature and a coil in said electrical circuit, controlling means in said circuit for regulating the strength of current in said magnet coil, said controlling means being in operative connection with said armature, electrical measuring instruments in said circuit, the indications of which are determined by the strength of current in said magnet coil, a coiled spring between said receiving member and said armature and operative to transmit a part only of the force exerted on said receiving member under the influence of the variations of the measuring quantity to said armature, said armature being arranged to perform a rectilinear movement, and electrical means for automatically returning said armature to its zero position at the indicating positions of said instruments.

5. Apparatus for measuring the velocity and quantity of flowing media comprising a receiving member operative under the influence of the variations of said quantity, an electrical circuit, an electro-magnet comprising an armature and a coil in said electrical circuit, controlling means in said circuit for regulating the strength of current in said magnet coil, said controlling means being in operative connection with said armature, electrical measuring instruments in said circuit, the indications of which are determined by the strength of current in said magnet coil, a coiled spring between said receiving member and said armature and operative to transmit a part only of the force exerted on said receiving member under the influence of the variations of the measuring quantity to said armature, said armature being arranged to perform a rectilinear movement, and said coiled spring having its axis lying substantially parallel with the direction of movement of said armature, and electrical means for automatically returning said armature to its zero position at the indicating positions of said instruments.

6. Apparatus for measuring the velocity and quantity of flowing media comprising a receiving member operative under the influence of the variations of said quantity, an electrical circuit, an electro-magnet comprising an armature and a coil in said electrical circuit, controlling means in said circuit for regulating the strength of current in said magnet coil, said controlling means being in operative connection with said armature, electrical measuring instruments in said circuit, the indications of which are determined by the strength of current in said magnet coil, a coiled spring between said receiving member and said armature and operative to transmit a part only of the force exerted on said receiving member under the influence of the variations of the measuring quantity to said armature, said armature being arranged to perform a rectilinear movement, the receiving member being arranged to perform its movement substantially parallel with the movement of said armature, and electrical means for automatically returning said armature to its zero position at the indicating positions of said instruments.

7. Apparatus for measuring the velocity and quantity of flowing media comprising a receiving member operative under the influence of the variations of said quantity, an electrical circuit, an electro-magnet comprising an armature and a coil in said electrical circuit, controlling means in said circuit for regulating the strength of current in said magnet coil, said controlling means being in operative connection with said armature, electrical measuring instruments in said circuit, the indications of which are determined by the strength of current in said magnet coil, a coiled spring between said receiving member and said armature and operative to transmit a part only of the force exerted on said receiving member under the influence of the variations of the measuring quantity to said armature, said armature being arranged to perform a rectilinear movement, and said coiled spring having its axis lying substantially parallel with the direction of movement of said armature, the receiving member being arranged to perform its movement substantially parallel with the movement of said armature, and electrical means for automatically returning said armature to its zero position at the indicating positions of said instruments.

8. Apparatus for measuring the velocity and quantity of flowing media comprising a receiving member operative under the influence of the variations of said quantity, an electrical circuit, an electro-magnet comprising an armature and a coil in said electrical circuit, controlling means in said circuit for regulating the strength of current of said magnet coil, said controlling means being in operative connection with said armature, electrical measuring instruments in said circuit, the indications of which are determined by the strength of current in said magnet coil, a coiled spring between said receiving member and said armature and operative to transmit a part only of the force exerted on said receiving member under the influence of the variations of the measuring quantity to said armature, said armature being arranged to perform a rectilinear movement, and said coiled spring having its axis lying substantially parallel with the direction of movement of said armature, the receiving member being arranged to perfirm its movement substantially parallel with the movement of said armature and forming a guide therefor, and electrical means for automatically returning said armature to its zero position at the indicating positions of said instruments.

9. Apparatus for measuring the velocity and quatity of flowing media comprising a receiving member operative under the influence of the variations of said quantity, an electrical circuit, an electro-magnet comprising an armature and a coil in said electrical circuit, controlling means in said circuit for regulating the strength of current in said magnet coil, said controlling means being in operative connection with said armature, electrical measuring instruments in said circuit, the indications of which are determined by the strength of current in said magnet coil, an elastic means between said receiving member and said armature, a second elastic means operating in parallel with said first mentioned elastic means and counter-acting the force exerted on said receiving member under the influence of the variations of the measuring quantity, the tension of said first mentioned elastic means being less than that of said second elastic means, and electrical means for automatically returning said armature to its zero position at the indicating positions of said instruments.

10. Apparatus for measuring the velocity and quantity of flowing media comprising a receiving member operative under the influence of the variations of said quantity, an electrical circuit, an electro-magnet comprising an armature and a coil in said electrical circuit, controlling means in said circuit for regulating the strength of current in said magnet coil, said controlling means being in operative connection with said armature, electrical measuring instruments in said circuit, the indications of which are determined by the strength of current in said magnet coil, an elastic transmitting member disposed between said receiving member and said armature and operative to transmit a part only of the force exerted on said receiving member under the influence of the variations of the measuring quantity to said armature, said armature being arranged to perform a turning movement, and electrical means for automatically returning said armature to its zero position at the indicating positions of said instruments.

11. Apparatus for measuring the velocity and quantity of flowing media comprising a receiving member operative under the influence of the variations of said quantity, an electrical circuit, an electro-magnet comprising an armature and a coil in said electrical circuit, controlling means in said circuit for regulating the strength of current in said magnet coil, said controlling means being in operative connection with said armature, electrical measuring instruments in said circuit, the indications of which are determined by the strength of current in said magnet coil, an elastic means between said receiving member and said armature, a second elastic means operating in parallel with said first mentioned elastic means and counter-acting the force exerted on said receiving member under the influence of the variations of the measuring quantity, the tension of said first mentioned elastic means being less than that of said second elastic means, said armature being arranged to perform a rectilinear movement, and electrical means for automatically returning said armature to its zero position at the indicating positions of said instruments.

12. Apparatus for measuring the velocity and quantity of flowing media comprising a receiving member operative under the influence of the variations of said quantity, an electrical circuit, an electro-magnet comprising an armature and a coil in said electrical circuit, controlling means in said circuit for regulating the strength of current in said magnet coil, said controlling means being in operative connection with said armature, electrical measuring instruments in said circuit, the indications of which are determined by the strength of current in said magnet coil, an elastic means between said receiving member and said armature, a second elastic means operating in parallel with said first mentioned elastic means and counter-acting the force exerted on said receiving member under the influence of the variations of the measuring quantity, the tension of said first mentioned elastic means being less than that of said second elastic means, said armature being arranged to perform a turning movement, and electrical means for automatically returning said armature to its zero position at the indicating positions of said instruments.

GUSTAV GEORG HERMAN RYDBERG.